United States Patent
Wang et al.

(10) Patent No.: US 10,030,813 B2
(45) Date of Patent: Jul. 24, 2018

(54) TARGET MOUNTING FIXTURE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Deyong Wang, Beijing (CN); Tong Wang, Beijing (CN); Yang Xia, Beijing (CN); Sai Zhang, Beijing (CN); Qiong Yang, Beijing (CN); Xintao Bao, Beijing (CN); Beifan Ma, Beijing (CN); Deguo He, Beijing (CN); Quan Zhang, Beijing (CN); Mianen Chen, Beijing (CN); Liang Peng, Beijing (CN); Zengli Liu, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/682,870

(22) Filed: Aug. 22, 2017

(65) Prior Publication Data
US 2018/0106424 A1    Apr. 19, 2018

(30) Foreign Application Priority Data
Oct. 14, 2016    (CN) .......................... 2016 2 1125591

(51) Int. Cl.
*F16M 13/02*    (2006.01)
*G09F 7/20*    (2006.01)
*F16M 11/08*    (2006.01)
*F16M 11/10*    (2006.01)
*G09F 15/00*    (2006.01)
*A47B 96/06*    (2006.01)

(52) U.S. Cl.
CPC .......... *F16M 13/022* (2013.01); *F16M 11/08* (2013.01); *F16M 11/10* (2013.01); *A47B 96/067* (2013.01); *G09F 7/20* (2013.01); *G09F 15/0012* (2013.01)

(58) Field of Classification Search
CPC ...... F16M 13/022; F16M 11/10; F16M 11/08; G09F 15/0012; G09F 7/20; A47B 96/067
USPC ............................................. 248/220.22, 544
See application file for complete search history.

(56) References Cited

U.S. PATENT DOCUMENTS

| | | | | |
|---|---|---|---|---|
| 5,944,896 A * | 8/1999 | Landesman | ......... | B05B 13/0285 118/500 |
| 7,891,622 B1 * | 2/2011 | O'Keene | ................ | F16M 11/10 16/358 |
| 8,777,703 B1 * | 7/2014 | Herron | .................... | A22B 5/161 452/128 |
| 2005/0139563 A1 * | 6/2005 | Bonerb | .................. | B66C 1/226 212/71 |
| 2009/0189032 A1 * | 7/2009 | Su | .......................... | F16M 11/08 248/179.1 |

(Continued)

Primary Examiner — Muhammad Ijaz
(74) Attorney, Agent, or Firm — Brooks Kushman P.C.

(57) ABSTRACT

The present disclosure provides a target mounting fixture, including: a target fixing frame for fixing a target, the target fixing frame including a hoisting portion; a target carrier detachably connected to the target fixing frame; and a moving unit connected to the target carrier for moving the target carrier to move the target.

8 Claims, 3 Drawing Sheets

(56) References Cited

U.S. PATENT DOCUMENTS

| | | | | |
|---|---|---|---|---|
| 2013/0146727 A1* | 6/2013 | Oh | ................ | F16M 13/02 |
| | | | | 248/277.1 |
| 2015/0246681 A1* | 9/2015 | Raper, Jr. | ................ | B66F 5/02 |
| | | | | 254/4 R |
| 2017/0350554 A1* | 12/2017 | Stifal | ................ | A47B 97/001 |

* cited by examiner

TARGET MOUNTING FIXTURE

CROSS-REFERENCE TO RELATED APPLICATION

This application claims priority to Chinese Patent Application No. 201621125591.6 filed on Oct. 14, 2016, which is incorporated herein by reference it its entirety.

TECHNICAL FIELD

The present disclosure relates to the field of display panel manufacturing technology, and more particularly to a target mounting fixture.

BACKGROUND

As a consumable for coating film, a target has a limited lifespan, and it needs to be replaced regularly. A time for replacement work largely determines an Overall Equipment Effectiveness (OEE) of a device, and then determines a production capacity of the device. At present, a target mounting operation is mainly achieved by hoisting and supporting the target through a crown block. For a current target mounting fixture, a fixing fixture is provided at each of an upper part and a lower part of the target, and then the fixture at the upper part of the target is mounted with a hoisting apparatus to realize a hoisting operation of dismounting and mounting of the target. At present, the crown block is needed in the entire process of a fixture operation, and different locations of the fixture and the target during the mounting and dismounting process of the target all need to be realized by moving the crown block, therefore a progress of the operation is limited by the crown block. In the case that operations are performed in multiple cavities, all of the operations must be performed in sequence, which greatly slows down the progress of the operation.

SUMMARY

The present disclosure provide in at least one embodiment a target mounting fixture capable of saving a mounting operating time of a target to improve an operating efficiency.

In one aspect, the present disclosure provide in some embodiments a target mounting fixture, including: a target fixing frame for fixing a target, the target fixing frame including a hoisting portion; a target carrier detachably connected to the target fixing frame; and a moving unit connected to the target carrier for moving the target carrier.

In some optional embodiments of the present disclosure, the target fixing frame includes: two fixing plates mounted at two opposite ends of a target back plate, each of the fixing plates includes a plurality of screw holes for connecting to the target back plate and at least one protrusive first fixing ring, the first fixing ring being provided with a first pin hole; a hanging bracket, the hanging bracket being provided with the hoisting portion, a connecting portion detachably connected to the target carrier and a second fixing ring arranged at a location corresponding to the first fixing ring, the second fixing being provided with a second pin hole; and a plug pin capable of extending through and being mounted into the first pin hole of the first fixing ring and the second pin hole of the second fixing ring.

In some optional embodiments of the present disclosure, the target carrier includes a bearing bracket for bearing the hanging bracket; wherein the connecting portion on the hanging bracket includes a supporting shaft arranged on the hanging bracket, and the bearing bracket is provided with a groove for placing therein the supporting shaft.

In some optional embodiments of the present disclosure, the moving unit includes a first moving mechanism for moving the target carrier along a first horizontal direction and a second horizontal direction perpendicular to each other.

In some optional embodiments of the present disclosure, the first moving mechanism includes: a lateral bearing working table; a first guide rail arranged on the lateral bearing working table and extending along the first horizontal direction; a first bearing plate capable of moving on the first guide rail; a second guide rail arranged on the first bearing plate and extending along the second horizontal direction; and a second bearing plate capable of moving on the second guide rail. The target carrier is arranged on the second bearing plate through the moving mechanism.

In some optional embodiments of the present disclosure, the moving unit includes a second moving mechanism for moving the target carrier along a vertical direction perpendicular to both the first horizontal direction and the second horizontal direction, the second moving mechanism includes: a first side wall arranged on the second bearing plate, the first side wall being provided with a third guide rail extending along the vertical direction; a sliding block connected to the target carrier and capable of moving on the third guide rail; and a driving portion for driving the sliding block to move on the third guide rail.

In some optional embodiments of the present disclosure, the driving portion includes: a pulley block at least including one fixed pulley; a first rotating portion; and a steel wire wound around the pulley block, one end of the steel wire being connected to the sliding block, and the other end being wound around the first rotating portion. The first rotating portion is capable of rotating to stretch the steel wire to drive the sliding block to move on the third guide rail.

In some optional embodiments of the present disclosure, the moving unit further includes a third moving mechanism for rotating the target carrier in a vertical plane perpendicular to a horizontal plane.

In some optional embodiments of the present disclosure, the third moving mechanism includes: a first side wall and a second side wall arranged opposite to each other on the second bearing plate, wherein the target carrier is mounted on the first side wall, one end portion of the first side wall and the second bearing plate are connected to each other through a pivot, the first side wall is rotatable around the pivot, and the second side wall is perpendicular to the second bearing plate; and a screw rod rotatably mounted in the second side wall, one end of the screw rod being connected to the first side wall, and the other end of the screw rod being provided with a second rotating portion. The screw rod is configured to drive the first side wall to rotate around the pivot through rotating the second rotating portion.

In some optional embodiments of the present disclosure, the target mounting fixture further includes a high-altitude platform apparatus for an operator to perform a high-altitude operation, and the high-altitude platform apparatus is connected to the lateral bearing working table.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

In order to solve the technical problem that different locations of the fixture and the target need to be realized by moving the crown block, the progress of operation is limited by the crown block and the operating efficiency is low, the present disclosure provides in at least one embodiment a target mounting fixture capable of saving operating time for mounting the target to improve an operating efficiency.

Figure 7:
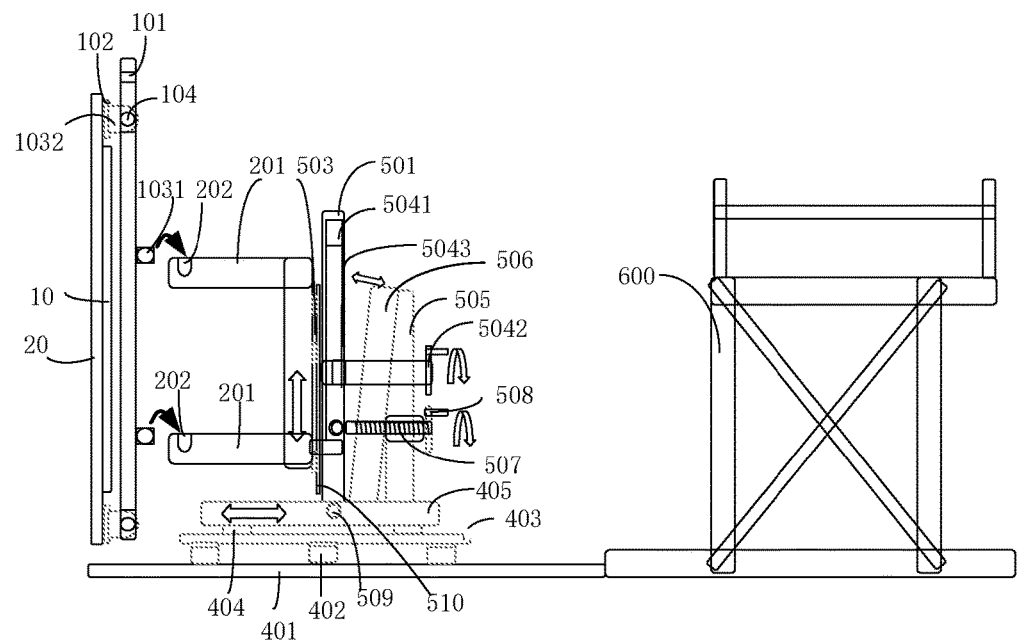
FIG. 7 is a schematic diagram showing an integral structure of the target mounting fixture provided by the present disclosure in at least one embodiment.

As shown in FIG. 7, the target mounting fixture provided by the present disclosure includes: a target fixing frame for fixing a target 10, the target fixing frame including a hoisting portion 101; a target carrier detachably connected to the target fixing frame; and a moving unit connected to the target carrier for moving the target carrier.

According to the target mounting fixture provided by the present disclosure, when dismounting and mounting the target 10, the target fixing frame may be hoisted through a crown block to hoist the target 10 to a target carrier located at an operating location, and then a moving mechanism is used to move the target carrier so as to satisfy requirements for different locations during the dismounting and mounting process of the target 10. After finishing hoisting the target 10 to the target carrier, the usage of the crown block ends, the crown block is only responsible for hoisting and handling, and is no longer responsible for hoisting the target 10 to different locations during the dismounting and mounting process of the target 10. Therefore, during the dismounting and mounting process of the target 10, the crown block may be used to hoist other targets 10 to save the operating time and improve the operating efficiency.

Thus it can be seen that, the present disclosure may realize a reduction of using hours of the crown block, as a bottleneck device, during mounting the target 10, realize a quick dismounting and mounting of the target 10, and realize a reduction of time for replacing the target 10, thus improving the OEE of the device and increasing the production capacity of the device.

Before describing the target mounting fixture according to embodiments of the present disclosure, first of all, a description of a dismounting and mounting process of the target will be carried out. Generally, a plurality of targets are mounted on a target back plate, when the targets is dismounted or mounted, the target back plate mounted with the plurality of targets is usually dismounted from, or mounted on a coating device.

In embodiments provided by the present disclosure, optionally, as shown in FIG. 1 to FIG. 6, the target fixing frame includes: two fixing plates 102 mounted at two opposite ends of a target back plate 20, each of the fixing plates 102 including a plurality of screw holes 1021 for connecting to the back plate 20 of the target 10 and at least one protrusive first fixing ring 1022, the first fixing ring 1022 being provided with a first pin hole 1023; a hanging bracket 103, the hanging bracket 103 being provided with the hoisting portion 101, a connecting portion 1031 detachably connected to the target carrier and a second fixing ring 1032 arranged at a location corresponding to the first fixing ring 1022, the second fixing ring 1032 being provided with a second pin hole 1033; and a plug pin 104 capable of extending through and being mounted into the first pin hole 1023 of the first fixing ring 1022 and the second pin hole 1033 of the second fixing ring 1032.

In the above solution, as shown in FIG. 1 to FIG. 6, the fixing plate 102 is configured to fix with the target back plate 20 to realize a connecting fixation between the plurality of targets 10. Specifically, a fixing screw may be configured to extend through and be mounted into the fixing plate 102 and the target back plate 20 to fix the target 10 on the fixing plate 102; and then the plug pin 104 may be configured to extend through and mounted into the first fixing ring 1022 on the fixing plate 102 and the second fixing ring 1032 on the hanging bracket 103 to fix the target 10 on the hanging bracket 103; after the target 10 being mounted on the entire coating device, the plug 104 may be pulled out, and then the fixing screw on the fixing plate 102 may be unscrew from the back plate 20 of the target 10. Therefore the dismounting and mounting process is simple and convenient.

Figure 1:
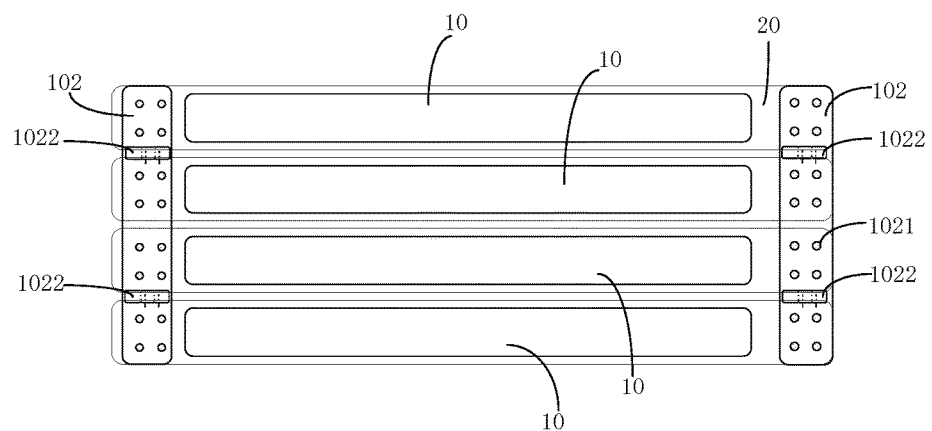
FIG. 1 is a schematic diagram showing a mounting structure of a fixing plate and a target back plate in a target mounting fixture provided by the present disclosure in at least one embodiment.
Figure 2:
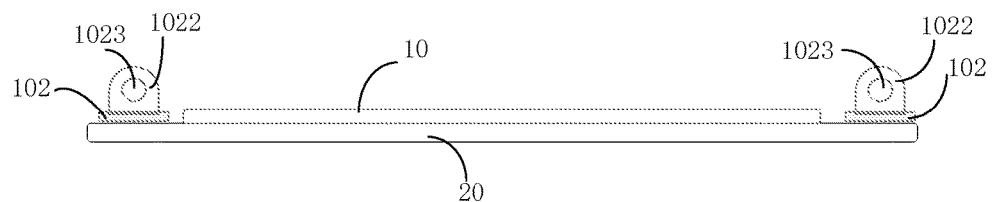
FIG. 2 is a side view of FIG. 1.
Figure 3:
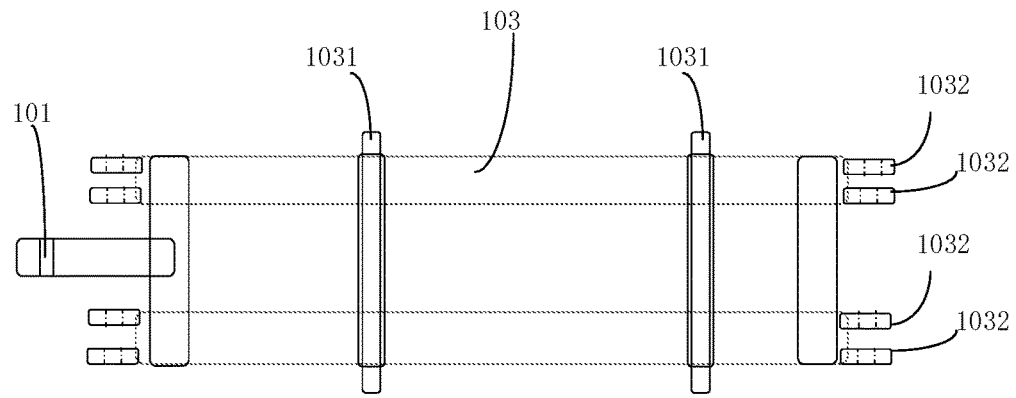
FIG. 3 is a schematic diagram showing a hanging bracket in the target mounting fixture provided by the present disclosure in at least one embodiment.
Figure 4:
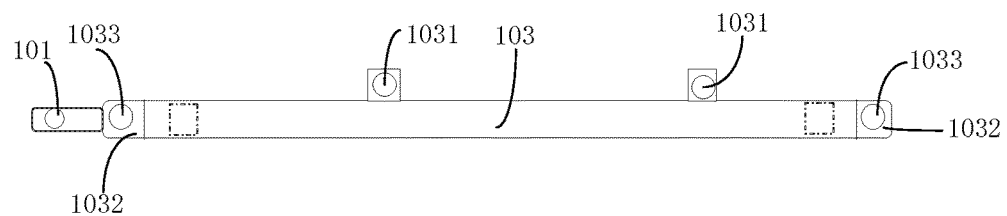
FIG. 4 is a side view of FIG. 3.
Figure 5:
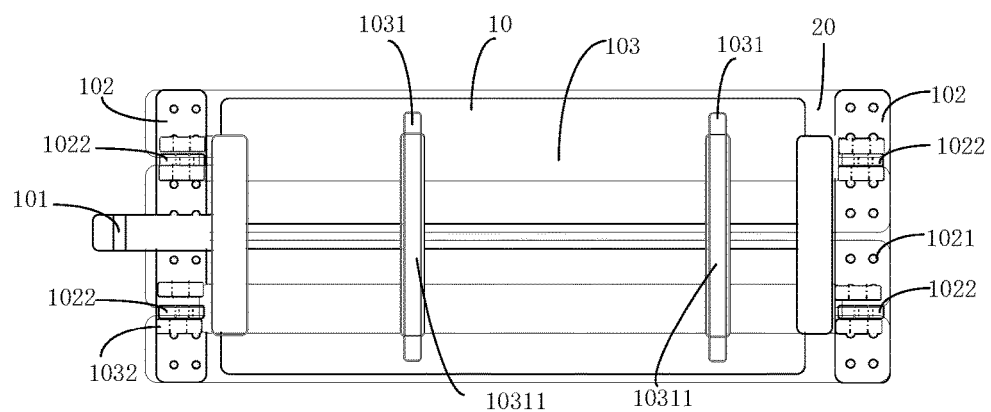
FIG. 5 is a schematic diagram showing a mounting structure of a target fixing unit and the target in the target mounting fixture provided by the present disclosure in at least one embodiment.
Figure 6:
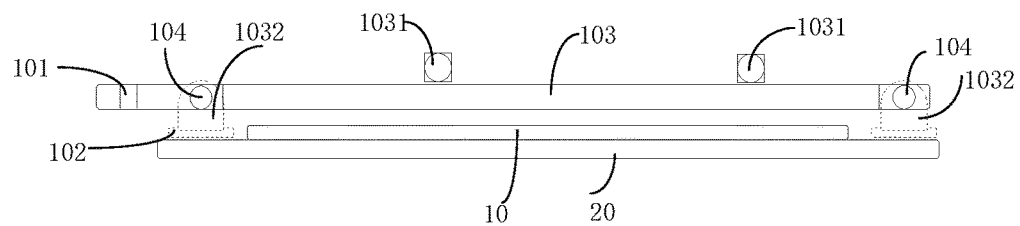
FIG. 6 is a side view of FIG. 5.

It should be noted that, as shown in FIG. 3 and FIG. 5, in one optional embodiment provided by the present disclosure, the hoisting portion 101 is of a hoisting hole structure, two opposite ends of the hanging bracket 103 each is provided with the second fixing ring 1032, and one first fixing ring 1022 is arranged corresponding to two second fixing rings 1032. When mounting and fixing the target back plate 20 and the hanging bracket 103, the first fixing ring 1022 is inserted between two second fixing rings 1032 to which the first fixing ring 1022 corresponds, and then the plug pin 104 is inserted into the pin hole of the first fixing ring 1022 and the pin hole of the second fixing ring 1032.

Obviously, it should be understood that, in a practical application, the target fixing frame may be realized by other structures, which shall not be illustrated in detail herein.

In embodiments provided by the present disclosure, optionally, as shown in FIG. 7, the target carrier includes a bearing bracket 201 for bearing the hanging bracket 103. The connecting portion 1031 on the hanging bracket 103 includes a supporting shaft 10311 arranged on the hanging bracket 103, and the bearing bracket 201 is provided with a groove 202 for placing therein the supporting shaft 10311.

In some embodiments, the target carrier includes the bearing bracket 201, the connecting portion 1031 on the hanging bracket 103 includes the supporting shaft arranged at the middle of the hanging bracket 103. After hoisting the hanging bracket 103 to the operating location using the crown block, the supporting shaft may be placed into the groove 202 on the bearing bracket 201. The coordinating manner of the supporting shaft and the groove 202 facilitates picking-and-placing the hanging bracket 103.

Obviously, it should be understood that, in a practical application, the specific structure of the target carrier and the coordinating manner between the target carrier and the bearing bracket 201 may not merely be limited to the above.

In embodiments provided by the present disclosure, optionally, the moving unit includes a first moving mechanism for moving the target carrier along a first horizontal direction and a second horizontal direction perpendicular to each other. By arranging the first moving mechanism, the target carrier may be moved forward, backward, right and left, along the horizontal direction to satisfy requirements for the target 10 to be moved to different locations along the horizontal direction during the dismounting and mounting process of the target 10.

In at least one optional embodiment provided by the present disclosure, as shown in FIG. 7, the first moving mechanism includes: a lateral bearing working table 401; a first guide rail 402 arranged on the lateral bearing working table 401 and extending along the first horizontal direction; a first bearing plate 403 capable of moving on the first guide rail 402; a second guide rail 404 arranged on the first bearing plate 403 and extending along the second horizontal direction; and a second bearing plate 405 capable of moving on the second guide rail 404. The target carrier is arranged on the second bearing plate 405.

In the above solution, linear guide rails are used to realize moving the target carrier forward, backward, right and left along the horizontal direction, and a simple structure may be achieved. It should be understood that, in a practical application, the shown first moving mechanism may also be realized by other manners, and the specific embodiments of the first moving mechanism shall not be limited herein.

In embodiments provided by the present disclosure, as shown in FIG. 7, optionally, the moving unit includes a second moving mechanism for moving the target carrier along a vertical direction perpendicular to both the first horizontal direction and the second horizontal direction. The second moving mechanism includes: a first side wall 501 arranged on the second bearing plate 405, the first side wall 501 being provided with a third guide rail 510 extending along the vertical direction; a sliding block 503 connected to the target carrier and capable of moving on the third guide rail; and a driving portion for driving the sliding block 503 to move on the third guide rail.

By adopting the above solution, the second moving mechanism may drive the sliding block 503 to move up and down along the third guide rail through the driving portion to realize moving the target 10 along the vertical direction, thus satisfying requirements of mounting spaces for the target 10.

In embodiments provided by the present disclosure, optionally, as shown in FIG. 7, the driving portion includes: a pulley block 5041 at least including one fixed pulley; a first rotating portion 5042; and a steel wire 5043 wound around the pulley block 5041, one end of the steel wire 5043 being connected to the sliding block 503, and the other end being wound around the first rotating portion 5042. Here, the first rotating portion 5042 may be rotated to stretch the steel wire 5043 to drive the sliding block 503 to move on the third guide rail.

In the above solution, the pulley block 5041 is used to adjust the locations of the target 10 and control the up and down movement of target 10. By rotating the first rotating portion 5042, the steel wire 5043 wound around the first rotating portion 5042 may drive the sliding block 503 to move up and down through the pulley block 5041, thus realizing moving the target carrier up and down.

The first rotating portion 5042 may be a rotating handle or a rotating winch and so on to facilitate the operator to perform the rotating operation. The pulley block 5041 may at least include one fixed pulley, any may further include at least one movable pulley, and an elevation accuracy of the sliding block 503 may be controlled and a force for the operator to swing the first rotating portion 5042 may be reduced, by setting different diameter ratios of the fixed pulley and the movable pulley, therefore it is force-saving and easy to operate.

It should be understood that, in a practical application, the driving portion may also be realized by other structures, which shall not be limited herein.

In embodiments provided by the present disclosure, optionally, as shown in FIG. 7, the moving unit further includes a third moving mechanism for rotating the target carrier in a vertical plane perpendicular to a horizontal plane.

By adopting the above solution, the third moving mechanism is arranged to realize the rotation of the target 10 so as to satisfy requirement for the space location of the target 10. Optionally, as shown in FIG. 7, the third moving mechanism includes: a first side wall 501 and a second side wall 505 arranged opposite to each other on the second bearing plate 405, wherein the target carrier is mounted on the first side wall 501, one end portion of the first side wall 501 and the second bearing plate 405 are connected to each other through a pivot 509, the first side wall 501 is rotatable around the pivot 509, and the second side wall 505 is perpendicular to the second bearing plate 405; and a screw rod 507 rotatably mounted in the second side wall 505, one end of the screw rod 507 being connected to the first side wall 501, and the other end of the crew rod 507 being provided with a second rotating portion 508.

The second rotating portion 508 may be a rotating handle or a rotating winch and so on to facilitate the operator to perform the rotating operation. When rotating the second rotating portion 508, the screw rod 507 drives the first side wall 501 to rotate around the pivot 509 and further drives the target carrier mounted on the first side wall 501 to rotate, thus realizing the rotation of the target 10.

It should be noted that, in the above solution, the first side wall 501 may not only be configured to arrange the third guide rail to enable the sliding block 503 in the second moving mechanism to move thereon, but also may coordinate with the second side wall 505 and the screw rod 507 to realize the rotation of the target carrier.

In addition, as shown in FIG. 7, the shown third moving mechanism may further include an inclined wall 506 arranged between the first side wall 501 and the second side wall 505 for playing a limiting and protecting effect on the first side wall 501.

In addition, what should be further noted is that, in a practical application, the third moving mechanism may also be realized by other manners, which shall not be illustrated in detail herein.

In addition, as shown in FIG. 7, in embodiments provided by the present disclosure, optionally, the target mounting fixture further includes a high-altitude platform apparatus 600 for an operator to perform a high-altitude operation, and the high-altitude platform apparatus 600 is connected to the lateral bearing working table 401.

The target carrier, the moving unit and the high-altitude platform apparatus of the target mounting fixture are arranged at a high-altitude operating location, and a high-altitude operator performs high-altitude operations such as dismounting and mounting the target fixing unit and the target carrier and moving the target carrier using the moving unit on the high-altitude platform apparatus to realize dismounting and mounting of the target.

The above are merely the optional embodiments of the present disclosure. It should be noted that, a person skilled in the art may make improvements and modifications without departing from the principle of the present disclosure, and these improvements and modifications shall also fall within the scope of the present disclosure.

What is claimed is:

1. A target mounting fixture, comprising:
a target fixing frame for fixing a target, the target fixing frame comprising a hoisting portion;
a target carrier detachably connected to the target fixing frame; and
a moving unit connected to the target carrier for moving the target carrier;
wherein the target fixing frame comprises: two fixing plates mounted at two opposite ends of a target back plate, each of the fixing plates comprises a plurality of screw holes for connecting to the target back plate and at least one protrusive first fixing ring, the first fixing ring being provided with a first pin hole; a hanging bracket, the hanging bracket being provided with the hoisting portion, a connecting portion detachably connected to the target carrier and a second fixing ring arranged at a location corresponding to the first fixing ring, the second fixing ring being provided with a second pin hole; and a plug pin capable of extending through and being mounted into the first pin hole of the first fixing ring and the second pin hole of the second fixing ring;
wherein the target carrier comprises a bearing bracket for bearing the hanging bracket;
wherein the connecting portion on the hanging bracket comprises a supporting shaft arranged on the hanging bracket, and the bearing bracket is provided with a groove for placing therein the supporting shaft.

2. The target mounting fixture according to claim 1, wherein
the moving unit comprises a first moving mechanism for moving the target carrier along a first horizontal direction and a second horizontal direction perpendicular to each other.

3. The target mounting fixture according to claim 2, wherein the first moving mechanism comprises:
a lateral bearing working table;
a first guide rail arranged on the lateral bearing working table and extending along the first horizontal direction;
a first bearing plate capable of moving on the first guide rail;
a second guide rail arranged on the first bearing plate and extending along the second horizontal direction; and
a second bearing plate capable of moving on the second guide rail;
wherein the target carrier is arranged on the second bearing plate through the first moving mechanism.

4. The target mounting fixture according to claim 3, wherein
the moving unit comprises a second moving mechanism for moving the target carrier along a vertical direction perpendicular to both the first horizontal direction and the second horizontal direction,
the second moving mechanism comprises:
a first side wall arranged on the second bearing plate, the first side wall being provided with a third guide rail extending along the vertical direction;
a sliding block connected to the target carrier and capable of moving on the third guide rail; and
a driving portion for driving the sliding block to move on the third guide rail.

5. The target mounting fixture according to claim 4, wherein the driving portion comprises:
a pulley block at least comprising one fixed pulley;
a first rotating portion; and
a steel wire wound around the pulley block, one end of the steel wire being connected to the sliding block, and the other end being wound around the first rotating portion;
wherein the first rotating portion is capable of rotating to stretch the steel wire to drive the sliding block to move on the third guide rail.

6. The target mounting fixture according to claim 3, wherein
the moving unit further comprises a third moving mechanism for rotating the target carrier in a vertical plane perpendicular to a horizontal plane.

7. The target mounting fixture according to claim 6, wherein the third moving mechanism comprises:
a first side wall and a second side wall arranged opposite to each other on the second bearing plate, wherein the target carrier is mounted on the first side wall, one end portion of the first side wall and the second bearing plate are connected to each other through a pivot, the first side wall is rotatable around the pivot, and the second side wall is perpendicular to the second bearing plate; and
a screw rod rotatably mounted in the second side wall, one end of the screw rod being connected to the first side wall, and the other end of the screw rod being provided with a second rotating portion; wherein the screw rod is configured to drive the first side wall to rotate around the pivot through rotating the second rotating portion.

8. The target mounting fixture according to claim 3, wherein
the target mounting fixture further comprises a high-altitude platform apparatus for an operator to perform a high-altitude operation, and the high-altitude platform apparatus is connected to the lateral bearing working table.

* * * * *